(No Model.)

J. R. HAIGHT.
CORSET FASTENING.

No. 420,409. Patented Jan. 28, 1890.

ATTEST.
J. Henry Kaiser.
Chas. E. Hunt

INVENTOR.
James R. Haight
by Franck W. Johns
Attorney

UNITED STATES PATENT OFFICE.

JAMES R. HAIGHT, OF ADRIAN, ASSIGNOR OF ONE-HALF TO FRANK I. BOWLES, OF DETROIT, MICHIGAN.

CORSET-FASTENING.

SPECIFICATION forming part of Letters Patent No. 420,409, dated January 28, 1890.

Application filed January 26, 1889. Serial No. 297,691. (No model.)

*To all whom it may concern:*

Be it known that I, JAMES R. HAIGHT, a citizen of the United States, residing at Adrian, in the county of Lenawee and State of Michigan, have invented certain new and useful Improvements in Corset-Fastenings; and I do hereby declare the following to be a full, clear, and exact description of the invention, such as will enable others skilled in the art to which it appertains to make and use the same.

My invention relates to certain improvements in corset fastenings or clasps.

Heretofore corset-clasps have been constructed of a single piece of wire bent to form a loop and having a contracted aperture behind the eye of the loop, so as to form a spring-locking clasp. In this form of clasp, however, the stud was held at the extreme end of the loop, and as said loop had no bearing on the steel to which the stud was attached beyond said stud the two steels were apt to tilt at an angle to each other, rendering it very uncomfortable for the wearer. Moreover, to get sufficient strength and stiffness to form the spring-lock for the clasp, quite heavy wire has to be used, which renders the clasp very difficult to fasten or unfasten.

The object of my invention is to overcome these objections and produce a corset fastening or clasp formed of a single piece of wire bent to form a spring-locking clasp or loop, and having a projecting portion extending, when fastened, beyond the stud on the opposite steel, and having a bearing on said steel, so as to prevent the two steels from tilting at an angle to each other.

The particular construction and arrangement of my said invention I will now proceed to point out and describe, reference being had to the accompanying drawings, in which—

Figure 1:
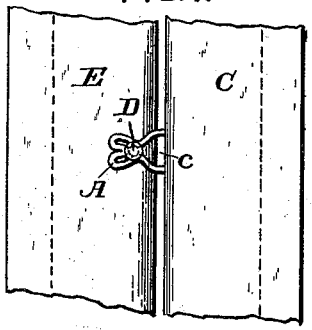
Figure 2:
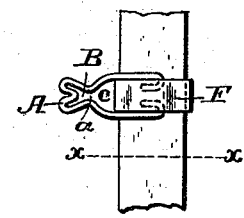
Figure 3:
Figure 4:
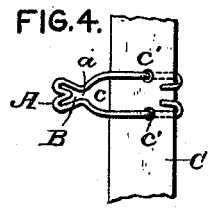
Figure 5:
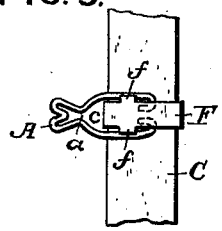
Figure 6:
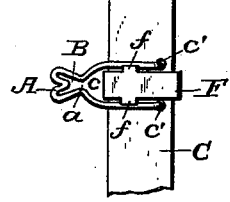

Figure 1 is a view showing portions of two corset-steels with the preferred form of my improved fastener attached, showing the stud secured in the fastener. Fig. 2 is a view showing the preferred means for securing the fastener to the steel; Fig. 3, a section taken on the line *x x* of Fig. 2. Figs. 4, 5, and 6 are views showing different means for securing the fastener to the steel; and Figs. 7 and 8 are further embodiments of my invention.

Figure 7:
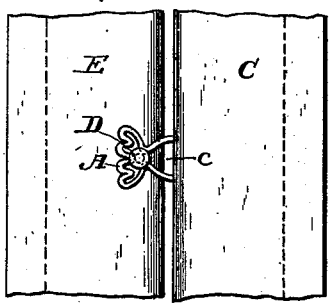
Figure 8:
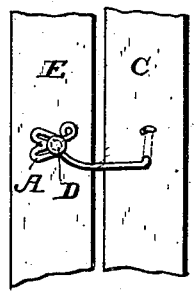

Referring to said drawings, the fastener is composed of a continuous piece of spring-wire bent or folded back upon itself to form one or more loops A, preferably one, as shown in Fig. 1, although several loops may be formed, as shown in Fig. 7. The opposite portions of the wire are then bent in toward each other, forming a contracted space *a* between the same, and also forming an eye B between said contracted space and the loops, said loops being so arranged that one of the same will come opposite the contracted space. The two ends of the wire are then secured to the steel C in any suitable manner, leaving an aperture *c* between the edge of the steel C and contracted space *a* of sufficient size to receive the head of the stud D, secured to the opposed steel E, the distance between the parts of the wire where the contracted space is formed being less than the diameter of the shank of the stud. When said stud is inserted in the space *c* and forced out through the contracted space *a* into the eye B of the fastener by reason of the spring quality of the wire, it is automatically locked and held in the eye B. The loop or loops A form a projection extending beyond said eye B, and have a bearing upon the steel E beyond the stud, thus preventing the two steels C and E from tilting at an angle to each other and holding the same substantially in the same plane, also strengthening the fastener. Moreover, by forming the loops A beyond the eye of the fastener a comparatively heavy wire can be used, which will possess the required spring.

I preferably secure the fastener to the steel, as shown in Figs. 2 and 3, in which the ends of the wire are bent in toward each other, a cap or clip F, placed over the same, and its ends bent over the edges of the steel. Sufficient pressure is then applied and the wire clamped between the cap and steel, so as to force said wire into both the cap and steel and substantially form grooves in both parts in which the wire is held. The clip may be formed with projections *f*, which engage with the opposite arms of the fastener, as shown in Fig. 5. The ends of the wire may also be passed through apertures $c'$ in the steel and bent up on its opposite side, and a clip F also used, as shown in Fig. 6; or said ends may simply be passed through the apertures and bent up over the edge of the steel, as shown in Fig. 4. Various other means may be used for securing the fastener to the steel.

It will be understood that the steels are covered with any desired fabric in the usual manner.

In Fig. 8 I show a further embodiment of my invention, in which the loops $a$, eye, and contracted aperture are formed, as before described. Only one arm of the wire, however, is secured to the steel, a sufficient space being left between the end of the other arm of said wire and the steel to permit the stud to be inserted into the fastener. In this form of my invention I use a slightly-heavier wire.

My invention is simple in its construction, can be manufactured cheaply, and thoroughly accomplishes the object for which it is designed.

Having thus fully described my said invention, I claim as new and desire to secure by Letters Patent—

1. A corset-fastening comprising a continuous piece of spring-wire, bent upon itself and having between the arms of the wire an aperture for the reception of the head of the stud of an opposed steel, and a retaining-eye connected with said aperture by a contracted space formed by oppositely-disposed bends in the arms of the wire, and one or more loops at the bend of said wire beyond the retaining-eye, said loops being adapted to engage the opposed steel beyond its stud, substantially as shown and described.

2. The combination, with a corset-steel, a fastening composed of a continuous piece of spring-wire bent upon itself and having an eye between the arms of the wire and one or more loops or bends beyond said eye, and the ends of said wire bent in toward each other, of a clip or cap extending over the bent ends of the wire and around the edges of the steel, to secure said fastening to said steel, substantially as shown and described.

In testimony whereof I affix my signature in presence of two witnesses.

JAMES R. HAIGHT.

Witnesses:
R. B. ROBBINS,
A. E. BARAGAR.